June 26, 1945.  M. SMOLENSKY  2,379,382
ANGLE VALVE STRUCTURE
Filed Aug. 25, 1943

Michael Smolensky,
INVENTOR.
BY Saywell & Wesseler,
ATTORNEYS.

Patented June 26, 1945

2,379,382

UNITED STATES PATENT OFFICE 2,379,382

ANGLE VALVE STRUCTURE

Michael Smolensky, Cleveland, Ohio

Application August 25, 1943, Serial No. 499,943

6 Claims. (Cl. 251—155)

This invention, as indicated, relates to an angle valve structure. More particularly, it comprises a valve structure providing a direct passageway and a angular passageway connected thereto with another angular passageway receiving and supporting the active valve mechanism, the valve plug seating against a valve seat in the main passageway. The invention also includes the provision of a symmetrical valve structure which may be reversed, the valve mechanism being placed in either angular passageway above the main through passageway, and the valve seat being provided across either end portion of the main through passageway. This structure may embody two different sizes of pipe diameter on the main through passageway, thus permitting a single structure of this type to be fitted in a restricted space where the receiving and delivery pipe diameters differ.

The principal object of the present invention is to provide a three-way valve adapted for easy fabrication and having a large internal area for fluid flow so that the valve mechanism will present a minimum of obstruction.

Another object of the invention is to provide a substantially symmetrical valve structure of reversible type.

Another object of the invention is to provide an angle valve structure having a main passageway adapted to be fitted to pipe connections of different sizes and having a valve housing and angular fluid passageway adapted to be interchanged in function to permit the use of the valve in reverse position.

Another object of the invention is to provide a valve body having a main through passageway and a V-shaped extension thereof providing a large internal area for free fluid flow and for positioning the valve mechanism selectively in either of two positions.

Another object of the invention is to provide a valve structure permitting free access to the various members thereof and renewal of portions requiring replacement.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain structures embodying the invention, such disclosed means constituting, however, but several of various forms in which the principle of the invention may be used.

Figure 1:
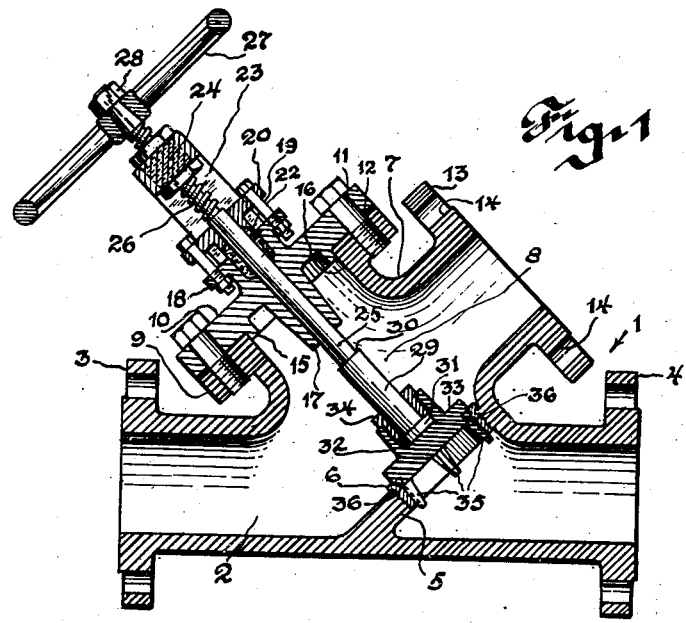
Figure 2:
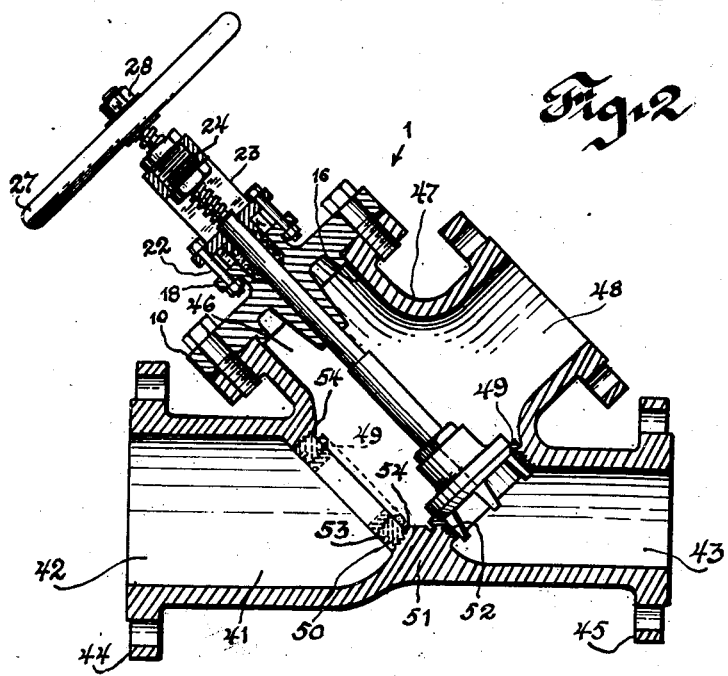

In said annexed drawing:

Fig. 1 is a central sectional view of a valve structure embodying the principles of the invention; and Fig. 2 is a view similar to Figure 1 showing a modified form of construction embodying the principles of the invention.

The valve construction illustrated in Figure 1 provides a casing 1 providing a through passageway 2 having flanges 3, 4, at its opposite ends and having a partition member 5 set angularly across the right-hand portion of said through passageway 2. The partition member is provided with a screw-threaded opening, into which a valve seat 6, preferably of stainless steel is screw-threadedly engaged. The body member is provided on one side with a substantially V-shaped enlargement 7, the outer wall of which is spaced from the main passageway substantially an equal distance to the width of such passageway whereby an enlarged fluid chamber 8 is provided within said extension. The extension on one arm of the V provides a flanged member 9 against which a plate 10 carrying the active valve structure is secured by suitable fastening elements engaged through the aligned bolt holes 11, 12, formed in the plate and on the flanged member 9. The opposite arm of the V comprises a flanged member 13 provided with bolt holes 14 whereby the same may be engaged in fluid-tight relation with the flange by a connecting pipeline.

The plate 10 is preferably provided internally with a flange 15 closely fitting the opening 16 through the flange member 9. The plate 10 is apertured centrally and has an inwardly projecting valve stem guide member 17, and on its outer face is provided with a flanged stuffing box 18 within the recess of which suitable packing 19 is received, such packing being under compression of the packing gland 20 which is drawn toward the stuffing box by suitable bolts 22.

A yoke member 23 is mounted on the valve plate 10 and carries a threaded yoke nut 24. The valve stem 25 has an upper threaded portion 26 engaged in the threaded yoke nut 24, and a handwheel 27 is secured to the valve stem by a suitable wheel nut 28. At its lower end the valve stem is provided with an enlargement 29, a shoulder 30 on which contacts the valve guide member 17 at its upper limit of motion. The lower end of the valve stem is provided with an enlarged head 31 held within a recess 32 centrally of the valve plug 33 and is held in rotatable relation with the plug by means of a flange retaining ring 34. The lower side of the plug is preferably provided with a plurality of guide members 35 and the plug at the point of contact with the valve seat is provided with an annular inclined sealing face 36.

The structure shown in Figure 2 in addition to the features heretofore described in connection with Figure 1 and bearing similar reference characters, provides for a straight line passageway through the main valve body 41 wherein one end 42 is of larger diameter than its opposite end 43, each of the ends being provided with flanges 44, 45, respectively, whereby they may be joined to pipes of corresponding size. The operative valve mechanism is housed within one arm 46 of the V-shaped extension 47, the other arm 48 which is formed of indentical size to the arm 46, thus permitting the operative valve structure to be positioned in either the passageway 46 or the passageway 48. The valve seat 49 is removable and when the valve mechanism is changed to reverse position it may be engaged within an adapter ring 50 which can be screw-threadedly inserted at a 45 degree angle opposite the passageway 48. In order to accommodate the two valve positions the casting provides a central enlargement 51 which is of reduced size and does not cross the central line of the passageway. The enlargement permits the formation of a screw-threaded opening 52 to receive the valve seat 49 in its normal position and also for a screw-threaded opening 53 of a size to receive the adapter 50 heretofore referred to, the adapter in turn receiving the valve seat 49 when the valve is reversed as heretofore stated. The adapter, it will be noted, is engaged in a position through the enlarged passageway 42 and seats against an annular shoulder 54 forming a projecting flange around the screw-threaded opening 53. This construction permits the valve to be used in special cases where the fluid supply line is of larger or smaller diameter, as the case may be, and the space for making connections somewhat limited.

It also provides for a large fluid supply through the opening 42 which is distributed through the smaller openings 48 and 43, respectively.

In each of the constructions shown, it will be noted that a very large central opening space is provided at the junction point of the several passageways thus permitting free flow of fluid through the valve structure in any direction with a minimum of vortex formation or friction losses.

Other modes of applying the principle of my invention may be employed instead of those explained, change being made as regards the structure herein disclosed, provided the means stated by any of the following claims or the equivalent of such stated means be employed.

I therefore particularly point out and distinctly claim as my invention:

1. An apparatus of the character described having in combination a body member providing a straight line fluid passageway longitudinally thereof, an enlarged extension integral with said body member at an intermediate position, said extension being of substantially V-shape, a branch passageway through one portion of said V-shaped extension, and a valve operating mechanism in the other portion of said V-shaped extension cooperating with a seat in the straight line passageway beyond the V-shaped extension.

2. An apparatus of the character described having in combination a body member providing a straight line fluid passageway longitudinally thereof, an enlarged extension integral with said body member at an intermediate position, said extension being of substantially V-shape, a branch passageway through one portion of said V-shaped extension, a valve operating mechanism in the other of said V-shaped extension, said valve mechanism projecting into said straight line fluid passageway, and an angular valve seat provided in said straight line passageway beyond the V-shaped extension to cooperate with said valve.

3. A valve construction comprising a body member providing a straight line passageway through the same, a V-shaped extension on said passageway opening into the central portion thereof, a valve seat in said straight line passageway beyond the point of connection on said V-shaped extension, an operative valve mechanism housed within and supported upon one portion of said V-shaped extension and adapted to cooperate with the valve seat, and an angular fluid passageway provided by the other portion of said V-shaped extension.

4. A valve housing providing a straight line fluid passageway and having an extension of substantially V-shape connected centrally thereto with the wall of such extension spaced from the wall of said straight line passageway substantially a distance of twice the diameter of said straight line passageway and providing a wide open area at the point of connection of said passageway, an angular valve seat formed in said straight line passageway beyond the V-shaped extension to cooperate with a valve mechanism supported in the angular portion of said extension opposite thereto, and a fluid passageway through the remaining angular portion of said V-shaped extension.

5. A valve structure providing a three-way angle fluid passageway comprising a main body member having a substantially straight line passageway and an extension portion of said body member providing angular passageways joining said straight line passageway from opposite directions at angles of 45 degrees, an operative valve mechanism disposed in one of said angularly positioned passageways, a valve seat angularly positioned within said straight line passageway opposite said valve mechanism and beyond the extension portion of said body to cooperate with said valve mechanism, and an angular fluid passageway through the other portion of said extension.

6. A valve structure adapted to be reversely connected to larger and smaller pipes, respectively, at the opposite end of a straight line passageway therethrough, a plurality of valve seats, for use selectively, provided centrally within said straight line passageway at a 45 degree angle thereto from either direction, and a pair of angularly positioned passageways connected to said main passageway at a central point thereof between said valve seats, one of said passageways providing a valve housing having a valve member adapted selectively to cooperate with one of said seats and the other an angular fluid passageway from said main straight line passageway.

MICHAEL SMOLENSKY.